Sept. 15, 1925.
M. G. BROWN
VEHICLE DIRECTION INDICATOR
Filed March 13, 1923  3 Sheets-Sheet 3
1,553,594
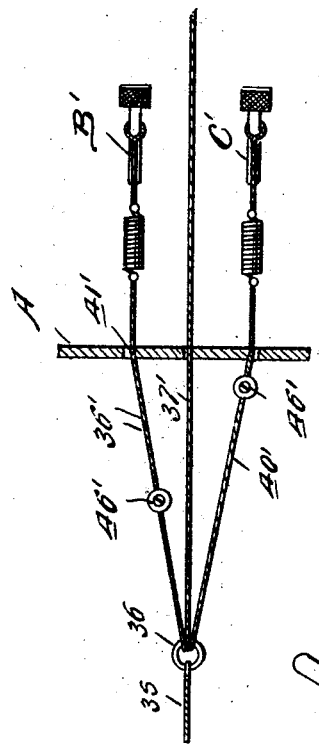
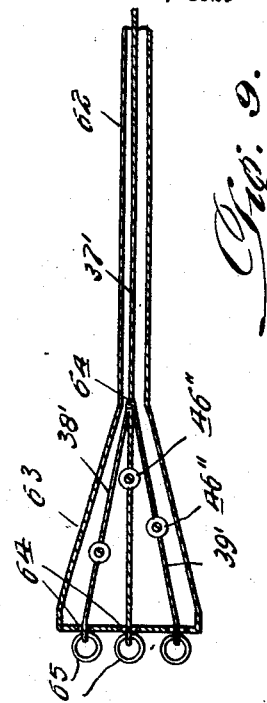
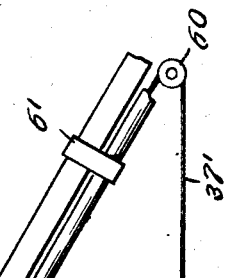

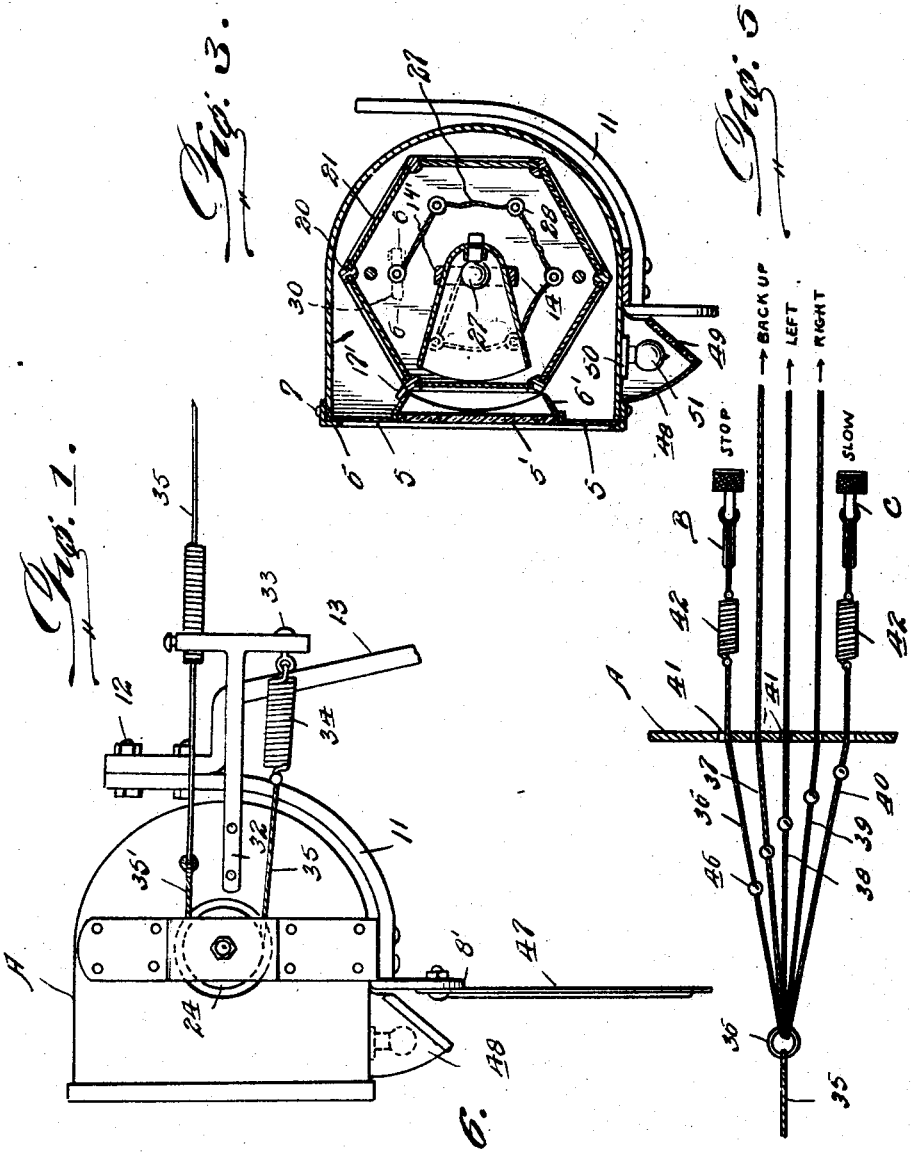

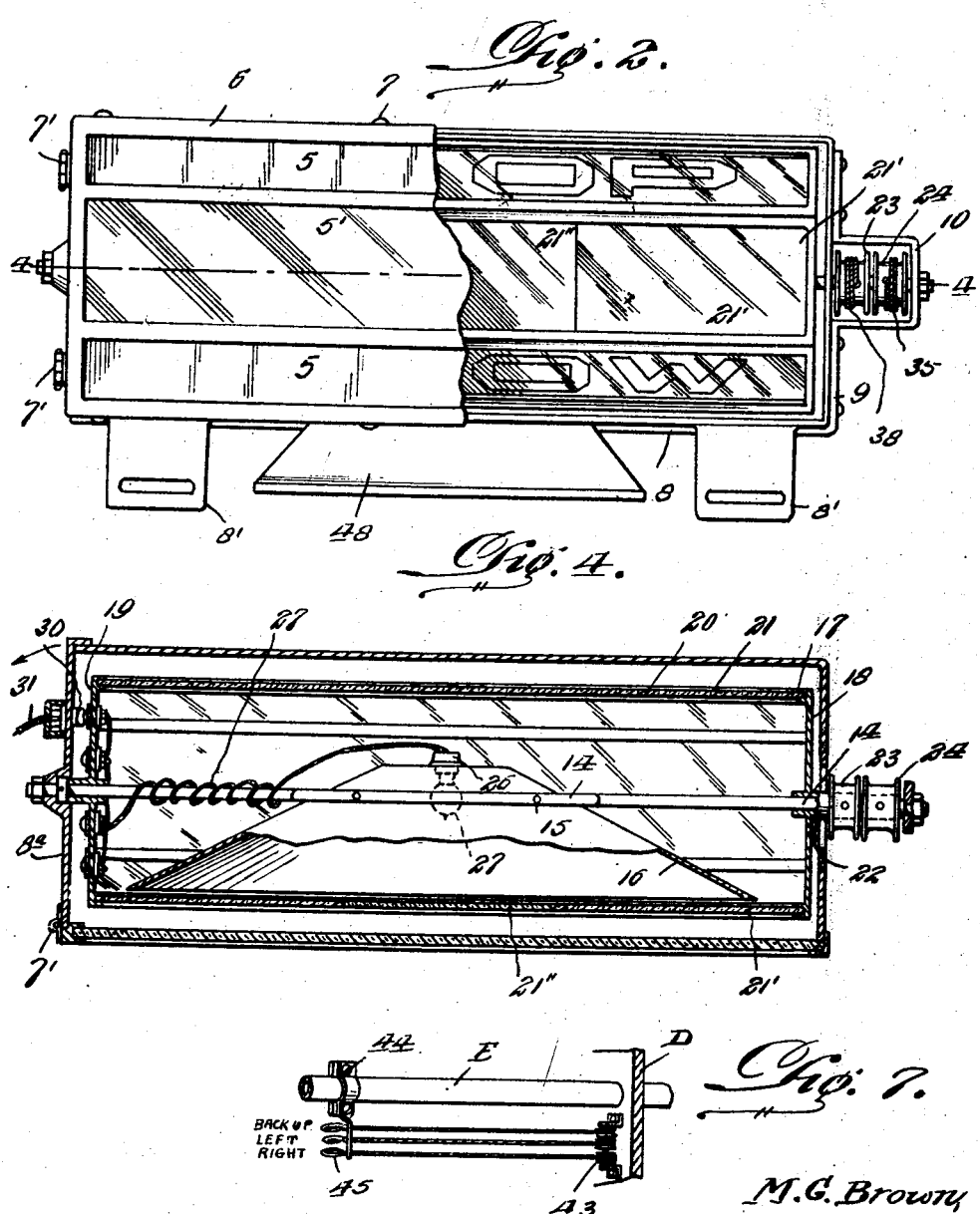

Patented Sept. 15, 1925.

1,553,594

UNITED STATES PATENT OFFICE.

MARSHALL G. BROWN, OF NEW PHILADELPHIA, OHIO.

VEHICLE DIRECTION INDICATOR.

Application filed March 13, 1923. Serial No. 624,707.

*To all whom it may concern:*

Be it known that I, MARSHALL G. BROWN, a citizen of the United States, residing at New Philadelphia, in the county of Tuscarawas and State of Ohio, have invented certain new and useful Improvements in Vehicle Direction Indicators, of which the following is a specification.

The primary object of my said invention resides in the provision of a direction indicator adapted for ready attachment to all types of motor vehicles wherein the intentions of the driver of the vehicle upon which the device is installed to make a right or left hand turn, or to bring his machine to a stop, etc., will be effectively indicated to the drivers of approaching vehicles in a novel and simple manner.

A further object of my invention is the provision of such an indicator that is comparatively simple of construction, the same embodying relatively few parts, and these so corelated as to reduce the liability of derangement to a minimum.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in Figures 1 to 6 inclusive, and wherein:—

Figure 1 is an end elevational view of an indicator constructed in accordance with my invention.

Figure 2 is a front elevational view thereof, the cover plate of the casing being partly broken away for more clearly disposing the internal mechanism of the indicator.

Figure 3 is a vertical transverse sectional view of my device.

Figure 4 is a longitudinal transverse cross sectional view, taken substantially upon the line 4—4 of Figure 2.

Figure 5 is what may be termed a plan view of the several operating cables employed in conjunction with this invention.

Figure 6 is a fragmentary enlarged cross sectional view upon the line 6—6 of Figure 3.

Figure 7 is a fragmentary elevational view of the motor vehicle steering column, disclosing in conjunction therewith, certain ones of the ends of the operating cables employed in connection with my invention, and Figure 7ª is a view similar to Figure 5, but disclosing a slightly modified form of operating cables.

Figure 8 is a view somewhat similar to Figure 7, showing in side elevation, the motor vehicle steering column, together with a housing supported thereon, which are arranged certain of the operating cables, forming a part of the invention, and Figure 9 is a longitudinal cross sectional view of this casing, showing more clearly the operating cables therein.

Referring to the drawings in detail, A designates a relatively elongated casing, the rear wall thereof being rounded as shown, and the front wall consisting of a removable metal plate 5, disposed within an open frame 6, which frame is secured as at 7 to the casing 5. This metal plate is formed with a central longitudinal opening within which is positioned a glass panel 5′, the edges of said opening being bent inwardly for providing a hood 6′. One end of the casing is open, and hingedly secured at the points 7′ to the said open frame 6 in a cover plate 8ª adapted for normally closing said open end of the casing.

Upon the bottom wall of the casing A, extending longitudinally therewith, and appropriately secured thereto is a strengthening strap 8, one end 9 of which is extended downwardly upon one end of the casing 5, and is formed with an outwardly bent U-shaped portion 10. Secured at one end to the central portion of said strap 8 is a rearwardly and upwardly extending arm 11, to the upper end of which is bolted or otherwise suitably secured at 12, one end of a bracket member 13, this bracket member adapted to be in turn secured at a convenient point upon the rear end of a motor vehicle such as the left hand fender thereof.

Extending longitudinally within the casing 5 is a stationary shaft 14, one end thereof extending through an opening in the said cover 8ª and secured therein by a nut, as shown in Figures 2 and 4. The opposite end of the shaft extends through a relatively large opening in the closed end of the casing and engages within an opening in the vertical wall of the U portion 10 of the strap 8, this being also secured within this opening of the said wall by a nut. The central portion of this shaft 14 is split to provide an upper and lower member 14' and 14", between which there is secured as at 15, the rear end of an outwardly flaring light ray projecting hood 16.

Rotatable upon said stationary shaft 14 and within the casing 5 is an indicating box 17, substantially hexagonal shape in cross section, as more clearly shown in Figure 3. This box 17 constitutes end plates 18 and 19, respectively, which are integrally joined by spaced cross connecting bars 20. The adjacent edges of these bars 20 are grooved for receiving therebetween plates of glass 21.

The end wall 18 of the signal box 17, is formed with a central opening, and surrounding this opening is a laterally projecting sleeve, Figure 4, which extends through the said opening in the adjacent end wall of the casing 5.

Upon this sleeve 22 there is keyed a pair of cable drums 23 and 24, for purposes hereinafter described. It is to be noted that these drums 23 and 24, as well as the sleeve 22, and adjacent end of the stationary shaft 14 are surrounded by the said U-shaped portion 10 of the end 9 of the strap 8.

Five of the glass plates 21 within the signal box 17 are formed with respectively, the words "Stop", "Back up", "Left", "Right", and "Slow" thereon, the sixth plate designated as 21' being formed of opaque glass with a central insertion 21" of red glass for purposes hereinafter described.

Within the closed end of the light projecting hood 16, there is positioned a lamp socket 26, for receiving an electric blub 26'. The socket 26 is provided with a single lead in wire 27, which has connection with contacts 28, engaging through the end wall 19 of said signal box 17. These contacts 28 are insulated from the respective wall of the box as at 29, and by a review of Figures 3 and 4, it will be noted that these contacts 26 are in an annular row upon the end wall of the signal box, each of the same being positioned directly beneath the cross connecting arms 20 of said signal box.

Upon the adjacent end wall of the casing 5, and internally thereof is a spring contact 30, which contact has electrical connection at 31 with a source of electric energy, which may be, and preferably is, the usual storage battery of a motor vehicle.

The end wall of the casing 5 adjacent the said pulleys 23 and 24 has secured thereto the inner end of a T-shaped bracket arm 32. Secured to the outer end of this T arm, through the instrumentality of an eye bolt 33, is one end of a coiled spring 34, the opposite end of said spring having connection with a flexible cable 35. This cable 35 engages around the outermost pulley 24, and is secured thereto. Engaging through an opening in the same end of the bracket arm 32 is a flexible wire 35, one end thereof being connected to the innermost pulley 23, through the medium of a cable 35' which is adapted to be wound thereon. The opposite end of this wire 35 carries a link 36, to which is secured the ends of operating cables 36, 37, 38, 39 and 40, respectively. These operating cables are engaged through spaced openings 41 within the floor board A of the motor vehicle, and the outermost ones of the cables 36 and 40 are respectively secured to the brake and clutch pedal B and C of the vehicle. It is preferable that these cables 36 and 40 be resiliently secured to the said pedals of the vehicle, through the instrumentality of coiled spring insertions 42. The remaining three cables 37, 38 and 39 extend forwardly and engage through openings within the foot board D of the vehicle, and thence over pulleys 43 upon said foot board. These cables further extend through openings in a metallic bracket 44, that is secured to the steering column E, and are provided at their ends with pull rings 45.

Rearwardly of the floor board A, each of the cables are provided with abutments 46, the same being spaced unequal distances from said floor board, and for the purpose of limiting the pull upon the respective cables.

The normal position of the signal box 17 within the casing 5 is as shown in Figure 3, and when in such a position, the unworded glass pane of the signal box will be directed forwardly of the light projector 16. This normal position of the signal box is maintained through the instrumentality of the cable 35 and spring 34, and in such a position, the circuit will be made to the bulb 27 through the proper one of the contacts 28 and the contact 30 for providing a tail-light for the motor vehicle.

Should the driver of the vehicle upon which my device is installed apply either the clutch or brake pedal, it will at once be understood that the respective cable will be pulled for consequently bringing to view the respective panel of the signal box 17 for indicating either a stop or the slowing of his machine. When this signal box 17 is rotated for indicating such intentions, the cable 35 will be wound thereon, and as soon as a pull is released upon the operating cables, it will be noted that the signal box will be rotated in a reverse direction for again bringing into view, the unworded glass plate of said signal box, and as a means for limiting the reverse rotation of the box, the same carries an abutment 17' which will strike against the said hood 6' of the removable front wall 5 of the casing A.

The said cross strap 8 secured to the bottom wall of the casing 5 may be, and preferably is, formed thereon with a pendent bracket 8', for the purpose of securing a license plate 47 thereto. Forwardly of these brackets 8', the bottom wall of the casing 5 is formed with a pendent hood 48, within the end of which is secured a panel or clear glass 49. Upon the said bottom wall of the casing 5, and within this hood 48 is a lamp socket 50, for receiving an incandescent bulb 51, the said socket 50 being electrically connected to the storage battery of a motor vehicle, the circuit being made and broken therebetween through the instrumentality of a desirable form of switch mounted in convenient reach of the driver of the vehicle, and it will at once be understood that the purpose of this construction is for providing an illuminating means for said license plate 47.

In Figures 7ª, 8 and 9, there is shown a slightly modified form of operating cables for the signal of my device. With reference to Figure 7ª specifically, the before mentioned cable 35 which is secured at one end to the drum 24, upon the end of the shaft 14, and carries a ring 36 at its opposite end, has secured thereto, through the instrumentality of this ring, three cables designated at 36', 37', and 40'. These cables extend rearwardly and engage through openings 41' within the said motor vehicle floor board A, the cables 36' and 40' being provided with abutments 46' forwardly of said floor boards A of a nature similar to the abutments 46 shown in Figure 5. These two mentioned cables are secured in a similar manner to the brake pedal B', and the clutch pedal C' of the motor vehicle. The cable 37' extends forwardly, and is engaged over a pulley 60, adjacent the lower end of the steering column E'. Upon this steering column, there is secured through strap brackets 61, a tubular housing 62, the upper end thereof being flared or increased in diameter for forming what may be termed a head 63. The said cable 37' is disposed within this casing and has secured thereto at a point 64 adjacent its free end the cables 38' and 39'. Each of these cables have positioned thereon similar abutments 46", arranged in spaced relation with each other, as clearly shown in Figure 9, for limiting the movement of these cables. Each of the cables extend outwardly through openings 64, within the said head 63 of the tubular casing 62, and are provided with ring pulleys 65.

Whenever it becomes desirable to remove the signal box 17 from the casing A, the end nuts may be removed from the shaft 14, after which the cover wall 8ª may be swung open upon its hinges 7', which will permit of the ready removal of the box, it being of course understood that the before mentioned relatively large opening within the closed end of said casing is of such dimensions as to permit the passage therethrough of the pulleys 23 and 24. Before removing the said signal box from the casing, it is necessary that the ends of the cables 35 and 35' be removed from these pulleys.

In view of the above description, it is my belief that the advantages and operation of a direction indicator for vehicles constructed in accordance with my invention will be readily appreciated by those skilled in the art, and while I have herein shown and described the preferred embodiment of the present invention, it is nevertheless to be understood that minor changes may be made therein, without departing from the spirit and scope of the invention as claimed.

Having thus described my invention, what I claim as new, and desire to secure by Letters-Patent is:—

1. A vehicle direction indicator including a casing having the front wall and one end open, a metal plate removably connected to the front wall of the casing formed with a rearwardly projecting hood, at the margin of an opening therein, a transparent panel mounted in the opening of the plate, a cover member for the open end of the casing hingedly mounted on the metal plate, a stationary shaft removably mounted in the cover member, and the opposite end of the casing, said shaft having the central portion formed with a pair of spaced sections, a light projecting hood between the sections of said shaft, said light projecting hood cooperating with the hood on the metal plate, a signal member rotatable on the shaft having end plates, and a plurality of signal elements carried circumferentially thereof, and being adapted for positioning between the hood in signalling position.

2. In combination, a rotatable signal including a shaft, a pair of drums on the shaft, a cable wound around one drum, a spring at the end of the cable fixed to a suitable support, and a second cable wound about the other drum so that the same may be pulled for rotating the drum and the signal whereby the spring will be tensioned, so as to retrieve the signal to its normal position.

In testimony whereof I affix my signature.

MARSHALL G. BROWN.